(12) United States Patent
Huang et al.

(10) Patent No.: US 10,611,860 B2
(45) Date of Patent: Apr. 7, 2020

(54) PROCESS FOR PREPARING BRANCHED POLYMER VIA EMULSION POLYMERIZATION AT ROOM TEMPERATURE

(71) Applicant: Changzhou University, Jiangsu (CN)

(72) Inventors: Wenyan Huang, Jiangsu (CN); Bibiao Jiang, Jiangsu (CN); Xiaoqiang Xue, Jiangsu (CN); Hongjun Yang, Jiangsu (CN); Qimin Jiang, Jiangsu (CN)

(73) Assignee: CHANGZHOU UNIVERSITY, Jiangsu (CN)

( * ) Notice: Subject to any disclaimer, the term of this patent is extended or adjusted under 35 U.S.C. 154(b) by 0 days.

(21) Appl. No.: 15/736,988

(22) PCT Filed: Apr. 20, 2017

(86) PCT No.: PCT/CN2017/081180
§ 371 (c)(1),
(2) Date: Dec. 15, 2017

(87) PCT Pub. No.: WO2018/120527
PCT Pub. Date: Jul. 5, 2018

(65) Prior Publication Data
US 2019/0263946 A1  Aug. 29, 2019

(30) Foreign Application Priority Data

Dec. 30, 2016  (CN) .......................... 2016 1 1261458
Dec. 30, 2016  (CN) .......................... 2016 1 1261467
Dec. 30, 2016  (CN) .......................... 2016 1 1263546

(51) Int. Cl.
| | |
|---|---|
| C08F 20/18 | (2006.01) |
| C08F 18/08 | (2006.01) |
| C08F 12/08 | (2006.01) |
| C08F 2/26 | (2006.01) |
| C08K 5/17 | (2006.01) |
| C08K 5/14 | (2006.01) |
| C08K 5/42 | (2006.01) |

(52) U.S. Cl.
CPC ................ *C08F 20/18* (2013.01); *C08F 2/26* (2013.01); *C08F 12/08* (2013.01); *C08F 18/08* (2013.01); *C08K 5/14* (2013.01); *C08K 5/17* (2013.01); *C08K 5/42* (2013.01); *C08F 2500/01* (2013.01)

(58) Field of Classification Search
CPC .......... C08F 20/18; C08F 12/08; C08F 18/08; C08F 2500/01; C08F 2/26; C08K 5/17; C08K 5/14; C08K 5/42
See application file for complete search history.

(56) References Cited

U.S. PATENT DOCUMENTS

2002/0076390 A1* 6/2002 Kantner ............... A61K 8/8147
424/70.16

FOREIGN PATENT DOCUMENTS

| CN | 101538341 A | | 9/2009 |
|---|---|---|---|
| CN | 10-2924640 A | * | 2/2013 |
| CN | 102911310 A | | 2/2013 |
| CN | 102924640 A | | 2/2013 |

* cited by examiner

*Primary Examiner* — Robert D Harlan
(74) *Attorney, Agent, or Firm* — Saliwanchik, Lloyd & Eisenschenk

(57) ABSTRACT

This invention discloses a process for preparing a branched polymer via emulsion polymerization at room temperature and is related to the field of polymer synthesis and preparation of functional polymers. A mixture of water as medium, anionic surfactant as emulsifier, sodium bicarbonate as pH regulator, the reductant monomer containing both polymerizable double bond and the reducing group combined with the persulfate as the oxidant to be useful as initiator, styrene, (meth) acrylate or vinyl acetate as monomer, is reacted to synthesize the branched polymers via a free radical in-situ emulsion polymerization at room temperature and ambient pressure. The monomer conversion can be above 85% in a range of about 10 mins to 10 hours of the reaction time. The process for preparing a branched polymer is carried out under the conditions of emulsion polymerization at room temperature and normal pressure without the addition or assistance of the branched monomer and other initiators. The advantages of this process are: it is a simple, feasible and stable polymerization process; no need to control temperature and pressure of the reaction; leads to low energy consumption, less impact on the environment, short reaction time and high monomer conversion; achieves high molecular weight and narrow molecular weight distribution of the branched polymers synthesized; results in low cost of the production owing to the direct use of commercial polymerizable reductant monomer in the reaction. The polymerization process of this invention also has many other advantages such as ease of operation, use of mild conditions, an environmentally friendly and low-cost process with a controllable degree of branching for the polymer, and highly suitable for synthesizing branched polymers from various monomers. The above advantages of this process are of great significance for the research and development and application of the branched polymers.

8 Claims, 4 Drawing Sheets

PROCESS FOR PREPARING BRANCHED POLYMER VIA EMULSION POLYMERIZATION AT ROOM TEMPERATURE

CROSS REFERENCE TO RELATED APPLICATIONS

This application is a National Stage Application of International Application Number PCT/CN2017/081180, filed Apr. 20, 2017; which claims priority to Chinese Application No. 201611263546.1, filed Dec. 30, 2016; Chinese Application No. 201611261467.7, filed Dec. 30, 2016; and Chinese Application No. 201611261458.8, filed Dec. 30, 2016; all of which are incorporated by reference in their entirety.

FIELD OF THE INVENTION

This invention is about a process for preparing branched polymers via emulsion polymerization at room temperature belonging to the fields of polymer synthesis and preparation of functional polymers. The polymerization system is simple and stable without needing any temperature control and leads to low energy consumption, less impact on the environment, high polymerization rate, high monomer conversion, high molecular weight and narrow molecular weight distribution of the branched polymers.

BACKGROUND OF THE INVENTION

Compared with linear polymers, branched polymers have low melt viscosity and solution viscosity, good solubility and multi-end groups due to the unique three-dimensional spherical structure. Addition of branched polymers is recommended for modification of polymers to prepare coatings with high solid content, and their use as adhesives, polymer catalysts and for drug delivery. However, there are still challenges for promoting the application of branched polymers owing to the limitation of the quantities of branched polymers that can be synthesized with needed branched structure and behavior. Therefore, it is still necessary and important to develop and explore the synthesis methods of branched polymers.

At present, the main processes for preparing the branched polymers are (a) live/controlled free radical solution polymerization using the inimer or divinyl monomer and (b) conventional free radical polymerization in the presence of chain transfer monomers. However, the reaction conditions of live/controlled free radical solution polymerization are relatively harsh and polymerization of monomers and polymer structures is limited along with other disadvantages such as the obtaining of relatively low molecular weight branched polymers, whose molecular weight distribution is relatively wide. In contrast, the reaction conditions of conventional free radical polymerization using chain transfer monomer is simple, but the molecular weight of the obtained branched polymers is relatively low and their molecular weight distribution is relatively wide. These two main types of polymerization processes for the preparation of branched polymers also have two common drawbacks during processing, i.e., high monomer conversion requires longer time for polymerization, and the reaction process uses a large amount of organic solvent, which could be hazardous to the environment. These deficiencies have restricted the development of large-scale application of branched polymers to some extent. Emulsion polymerization uses water as the medium, which is better for environmental protection and safety. In addition, by using the redox initiator system, the polymerization could be done at or below room temperature owing to the low activation energy needed for the initiation of reaction. The advantages of the polymerization process using this redox initiator system are fast polymerization speed, i.e., short reaction time leading to high polymer molecular weight and narrow molecular weight distribution of the polymers. The development of simplified and facile synthesis methods for the preparation of branched polymers is an important direction in the study of branched polymers, which is of great significance not only to the theoretical study but also for large-scale application of branched polymers.

Content of the Invention

This invention provides a facile method for the preparation of branched polymers with high molecular weight and narrow molecular weight distribution via free radical emulsion polymerization using the redox initiator system at room temperature. The in-situ preparation of branched polymers is accomplished by using the functional monomers with polymerizable double bonds and reductive groups as reducing agent and an oxidant without using any additional branched monomer at room temperature via emulsion polymerization. The polymerization system invented here is simple and stable, easy to be operated, uses short reaction time and leads to high monomer conversion, high molecular weight for the polymer and narrow molecular weight distribution. The molecular weight and branching degree of the polymer could be controlled and adjusted by varying the polymerization conditions.

A novel method of preparation of branched polymers via free radical emulsion polymerization at room temperature using the functional compound with polymerizable double bond and reductive groups as the reducing agent is revealed. The redox initiation system is composed of polymerizable monomer reducing agent, an oxidant, water as medium, anionic surfactant as emulsifier, sodium bicarbonate as pH modulator, vinyl monomer as polymerization monomers, polymerized free radical emulsion to get branched polymer at room temperature by in situ reaction.

The key novelty of this invention is the use of a commercially available polymerizable monomer reducing agent, potassium persulfate and ammonium persulfate as oxidants, which can be used to initiate the styrene, vinyl acetate or (meth) acrylate polymerization at room temperature under the conditions of free radical emulsion polymerization without the addition of other branched monomers and without increasing the reaction temperature. The branched polymers were successfully obtained at room temperature via in situ reaction. This process to prepare branched polymers is simple and practical, and can be achieved at low production cost.

In the preferred technological process, the vinyl monomer is styrene, (meth) acrylate compound, or vinyl acetate.

In the preferred technological process, the molar ratio of the polymerizable reducing agent monomer to the oxidant is 0.5~2:1.

In the preferred technological process, the molar ratio of the polymerizable reducing agent monomer and the monomer is 1~5:50.

In the preferred technological process, the mass ratio of water and the monomer is 2~6:1.

In the preferred technological process, the dosage of the pH modifier sodium bicarbonate is 3 wt %, ensuring that the polymerization system is stable and the pH value is 7~8, which is weakly alkaline.

In the preferred technological process, the polymerization temperature is room temperature, and the polymerization time is controlled in the range of 10 minutes to 10 hours.

In the preferred technological process, the polymerization method is emulsion polymerization, and the polymerization mechanism is free radical polymerization.

In the preferred technological process, the surfactant is sodium dodecyl benzene sulfonate or sodium dodecyl sulfate.

In the preferred technological process, the polymerizable monomer reducing agent is a tertiary amine containing polymerizable double bonds.

In the preferred technological process, the tertiary amine with polymerizable double bond is preferred with N,N'-dimethylamino ethyl methacrylate.

In the preferred technological process, the oxidant is peroxide, preferably potassium persulfate or ammonium persulfate.

In this invention, a redox initiation system is formed with tertiary amine containing polymerizable double bonds as monomers of the reducing agent and peroxides, which can initiate styrene, vinyl acetate, or (meth) acrylate to be polymerized via emulsion polymerization at room temperature. The branched polymers with high molecular weight and branching degree were obtained in-situ by this method. In the emulsion polymerization, only water was used as the reaction medium, which is safe and benign for the environment. Thus, the production of branched polymers not only saves the cost, but also has no effect on the environment.

At the same time, the redox initiator composed of the polymerizable tertiary amine and peroxide compound, can initiate the styrene, methyl methacrylate or vinyl acetate and propagate polymerization without additional branching agent. The branched polymers were prepared in situ. Owing to the low activation energy of the initiation system, the polymerization can proceed at or below room temperature. In this polymerization process, higher polymerization rate, shorter reaction time and higher monomer conversion, higher branching degree, higher molecular weight and narrower molecular weight distribution are obtained, which are the outstanding characteristics of this newly invented processing. Furthermore, the branching degree, the molecular weight and molecular weight distribution of the polymers can be adjusted by manipulating the polymerization conditions. The reaction system is simple and stable under the mild conditions used. It is also easy to be operated and suitable for large-scale application.

Compared with the present technology, the creativity and novelty of this invention is described as follows:

Firstly, in this invention, the use of the commercialized polymerizable monomer reducing agent without further purification greatly reduces the polymerization cost, the reaction system is simple and stable, can be operated under mild reaction conditions without needing any temperature control, less impact on the environment, low energy consumption and is suitable for large-scale industrialized production.

Secondly, in this invention, reaction time is short and monomer conversion rate is high, the molecular weight of the branched polymer is high and the distribution of molecular weight is narrow. The degree of branching, the molecular weight and molecular weight distribution of the polymers can be adjusted in a wide range, which is conducive to the precise control of the preparation of branched polymer with high branching degree and high molecular weight for meeting different requirements. It is also significant for the theoretical study of the synthesis process of the branched polymers.

EMBODIMENTS

Embodiment 1

Figure 1:
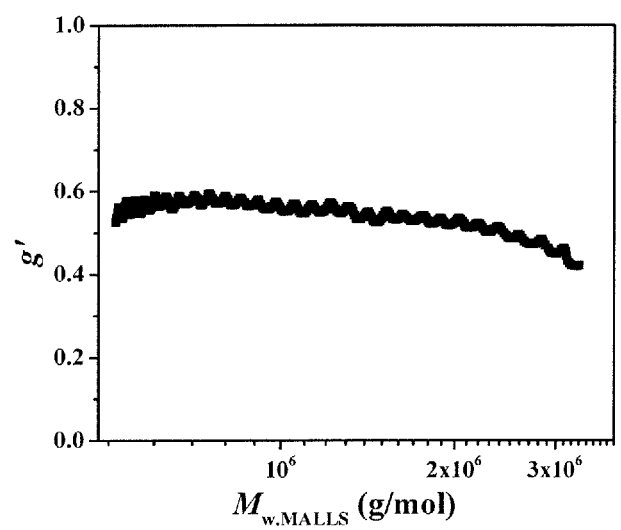
FIG. 1 shows the trend of variation of the branching factor g' of the branched polystyrene obtained in embodiment 1 vs molecular weight. (g' is the ratio of intrinsic viscosity of branched polymer and linear polymer with the identical molecular weight $g'=IV_{branched}/IV_{linear}$; the smaller is the g', the higher is the degree of branching).

Add styrene (5.0021 g, 0.0480 mol) and N,N'-dimethylamino ethyl methacrylate (0.3019 g, 0.0019 mol) to the reaction flask of the solution of sodium dodecyl sulfate (0.2500 g, 5 wt % styrene), sodium bicarbonate (0.1500 g, 3 wt % styrene), potassium persulfate (0.5191 g, 0.0019 mol) and water (20.0053 g, 400 wt % styrene) while stirring to homogenize. The flask was then evacuated to remove oxygen and then reacted at room temperature (~25° C.) for 6 hours. The styrene conversion rate was measured to be 90.34%. The emulsion was demulsified by ethanol and the obtained precipitate was washed three times with water followed by drying to obtain polymer. The polymer was purified by dissolving in tetrahydrofuran and precipitating in ethanol and this purification process was repeated three times followed by drying. The changes in molecular weight of the polymers and its distribution were measured and analyzed using triple detection size exclusion chromatography. The results are as follows: light scattering weight-average molecular weight $M_{w,MALLS}$=1125000 g/mol, molecular weight distribution of PDI=5.09, Mark-Houwink index=0.786 and branching factor g'=0.55, which continued that the polymer has branched structure. FIG. 1 shows the trend of variation of the branching factor g' of the branched polystyrene obtained in embodiment 1 vs molecular weight.

Embodiment 2

Add styrene (5.0006 g, 0.0480 mol) and N,N'-dimethylamino ethyl methacrylate (0.1510 g, 0.0010 mol) to the reaction flask of the solution of sodium dodecyl sulfate (0.2500 g, 5 wt % styrene), sodium bicarbonate (0.1500 g, 3 wt % styrene), potassium persulfate (0.2596 g, 0.0010 mol) and water (20.0020 g, 400 wt % styrene) while stirring to homogenize. The flask was then evacuated to remove oxygen and then reacted at room temperature (~25° C.) for 6 hours. The styrene conversion rate was measured to be 86.63%. The emulsion was demulsified by ethanol and the obtained precipitate was washed three times with water followed by drying to obtain polymer. The polymer was purified by dissolving in tetrahydrofuran and precipitating in ethanol and this purification process was repeated three times followed by drying. The changes in molecular weight of the polymers and its distribution were measured and analyzed using triple detection size exclusion chromatography. The results are as follows: light scattering weight-average molecular weight $M_{w,MALLS}$=1084000 g/mol, molecular weight distribution of PDI=6.66, Mark-Houwink index=0.723 and branching factor g'=0.86, which confirmed that the polymer has branched structure.

Embodiment 3

Add styrene (5.0015 g, 0.0480 mol) and N,N'-dimethyl-amino ethyl methacrylate (0.3019 g, 0.0019 mol) to the reaction flask of the solution of sodium dodecyl sulfate (0.2500 g, 5 wt % styrene), sodium bicarbonate (0.1500 g, 3 wt % styrene), potassium persulfate (0.7787 g, 0.0029 mol) and water (20.0018 g, 400 wt % styrene) while stirring to homogenize. The flask was then evacuated to remove oxygen and then reacted at room temperature (~25° C.) for 6 hours. The styrene conversion rate was measured to be 76.88%. The emulsion was demulsified by ethanol and the obtained precipitate was washed three times with water followed by drying to obtain polymer. The polymer was purified by dissolving in tetrahydrofuran and precipitating in ethanol and this purification process was repeated three times followed by drying. The changes in molecular weight of the polymers and its distribution were measured and analyzed using triple detection size exclusion chromatography. The results are as follows: light scattering weight-average molecular weight $M_{w,MALLS}$=461200 g/mol, molecular weight distribution of PDI=4.36, Mark-Houwink index=0.715 and branching factor g'=0.79, which confirmed that the polymer has branched structure.

Embodiment 4

Figure 2:
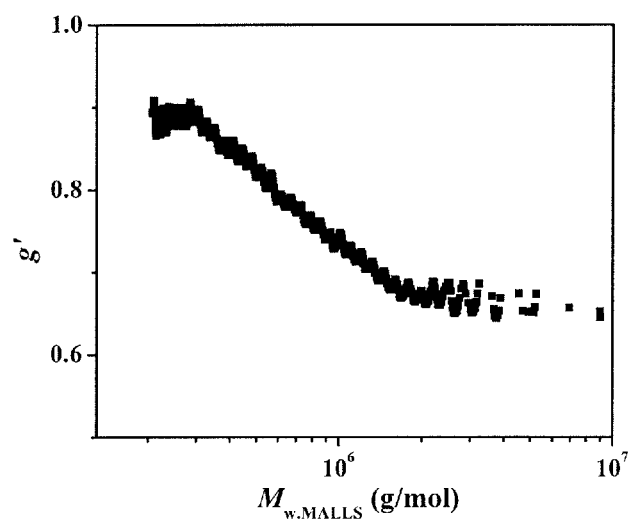
FIG. 2 shows the trend of variation of the branching factor g' of the branched polystyrene obtained in embodiment 4 vs molecular weight.

Add styrene (5.0007 g, 0.0480 mol) and N,N'-dimethyl-amino ethyl methacrylate (0.3019 g, 0.0019 mol) to the reaction flask of the solution of sodium dodecyl sulfate (0.2500 g, 5 wt % styrene), sodium bicarbonate (0.1500 g, 3 wt % styrene), potassium persulfate (0.5191 g, 0.0019 mol) and water (20.0031 g, 400 wt % styrene) while stirring to homogenize. The flask was then evacuated to remove oxygen and then reacted at room temperature (~35° C.) for 6 hours. The styrene conversion rate was measured to be 89.50%. The emulsion was demulsified by ethanol and the obtained precipitate was washed three times with water followed by drying to obtain polymer. The polymer was purified by dissolving in tetrahydrofuran and precipitating in ethanol and this purification process was repeated three times followed by drying. The changes in molecular weight of the polymers and its distribution were measured and analyzed using triple detection size exclusion chromatography. The results are as follows: light scattering weight-average molecular weight $M_{w,MALLS}$=487400 g/mol, molecular weight distribution of PDI=2.79, Mark-Houwink index=0.751 and branching factor g'=0.83, which confirmed that the polymer has branched structure. FIG. 2 shows the trend of variation of the branching factor g' of the branched polystyrene obtained in embodiment 4 vs molecular weight.

Embodiment 5

Add styrene (5.0012 g, 0.0480 mol) and N,N'-dimethyl-amino ethyl methacrylate (0.3019 g, 0.0019 mol) to the reaction flask of the solution of sodium dodecyl sulfate (0.2500 g, 5 wt % styrene), sodium bicarbonate (0.1500 g, 3 wt % styrene), potassium persulfate (0.4325 g, 0.0016 mol) and water (20.0005 g, 400 wt % styrene) while stirring to homogenize. The flask was then evacuated to remove oxygen and then reacted at room temperature (~25° C.) for 6 hours. The styrene conversion rate was measured to be 94.05%. The emulsion was demulsified by ethanol and the obtained precipitate was washed three times with water followed by drying to obtain polymer. The polymer was purified by dissolving in tetrahydrofuran and precipitating in ethanol and this purification process was repeated three times followed by drying. The changes in molecular weight of the polymers and its distribution were measured and analyzed using triple detection size exclusion chromatography. The results are as follows: light scattering weight-average molecular weight $M_{w,MALLS}$=592600 g/mol, molecular weight distribution of PDI=4.24, Mark-Houwink index=0.743 and branching factor g'=0.71, which confirmed that the polymer has branched structure.

Embodiment 6

Add styrene (5.0030 g, 0.0480 mol) and N,N'-dimethyl-amino ethyl methacrylate (0.3019 g, 0.0019 mol) to the reaction flask of the solution of sodium dodecyl sulfate (0.2500 g, 5 wt % styrene), sodium bicarbonate (0.1500 g, 3 wt % styrene), potassium persulfate (0.5191 g, 0.0016 mol) and water (20.0054 g, 400 wt % styrene) while stirring to homogenize. The flask was then evacuated to remove oxygen and then reacted at room temperature (~20° C.) for 6 hours. The styrene conversion rate was measured to be 89.27%. The emulsion was demulsified by ethanol and the obtained precipitate was washed three times with water followed by drying to obtain polymer. The polymer was purified by dissolving in tetrahydrofuran and precipitating in ethanol and this purification process was repeated three times followed by drying. The changes in molecular weight of the polymers and its distribution were measured and analyzed using triple detection size exclusion chromatography. The results are as follows: light scattering weight-average molecular weight $M_{w,MALLS}$=317000 g/mol, molecular weight distribution of PDI=3.69, Mark-Houwink index=0.750 and branching factor g'=0.87, which confirmed that the polymer has branched structure.

Embodiment 7

Add styrene (5.0011 g, 0.0480 mol) and N,N'-dimethyl-amino ethyl methacrylate (0.3019 g, 0.0019 mol) to the reaction flask of the solution of sodium dodecylbenzene sulfonate (0.2500 g, 5 wt % styrene), sodium bicarbonate (0.1500 g, 3 wt % styrene), ammonium persulfate (0.4332 g, 0.0019 mol) and water (25.0061 g, 500 wt % styrene) while stirring to homogenize. The flask was then evacuated to remove oxygen and then reacted at room temperature (~25° C.) for 8 hours. The styrene conversion rate was measured to be 89.27%. The emulsion was demulsified by ethanol and the obtained precipitate was washed three times with water followed by drying to obtain polymer. The polymer was purified by dissolving in tetrahydrofuran and precipitating in ethanol and this purification process was repeated three times followed by drying. The changes in molecular weight of the polymers and its distribution were measured and analyzed using triple detection size exclusion chromatography. The results are as follows: light scattering weight-average molecular weight $M_{w,MALLS}$=404600 g/mol, molecular weight distribution of PDI=3.75, Mark-Houwink index=0.751 and branching factor g'=0.88, which confirmed that the polymer has branched structure.

Embodiment 8

Add styrene (5.0023 g, 0.0480 mol) and N,N'-dimethyl-amino ethyl methacrylate (0.3019 g, 0.0019 mol) to the reaction flask of the solution of sodium dodecyl sulfate (0.2500 g, 5 wt % styrene), sodium bicarbonate (0.1500 g, 3 wt % styrene), potassium persulfate (1.0377 g, 0.0038 mol) and water (10.0012 g, 200 wt % styrene) while stirring to homogenize. The flask was then evacuated to remove oxygen and then reacted at room temperature (~25° C.) for 0.5 hours. The styrene conversion rate was measured to be 90.45%. The emulsion was demulsified by ethanol and the obtained precipitate was washed three times with water followed by drying to obtain polymer. The polymer was purified by dissolving in tetrahydrofuran and precipitating in ethanol and this purification process was repeated three times followed by drying. The changes in molecular weight of the polymers and its distribution were measured and analyzed using triple detection size exclusion chromatography. The results are as follows: light scattering weight-average molecular weight $M_{w,MALLS}$=396000 g/mol, molecular weight distribution of PDI=2.88, Mark-Houwink index=0.736 and branching factor g'=0.77, which confirmed that the polymer has branched structure.

Embodiment 9

Add styrene (5.0065 g, 0.0480 mol) and N,N'-dimethyl-amino ethyl methacrylate (0.1578 g, 0.0010 mol) to the reaction flask of the solution of sodium dodecyl sulfate (0.2500 g, 5 wt % styrene), sodium bicarbonate (0.1500 g, 3 wt % styrene), potassium persulfate (0.1356 g, 0.0005 mol) and water (20.0013 g, 400 wt % styrene) while stirring to homogenize. The flask was then evacuated to remove oxygen and then reacted at room temperature (~35° C.) for 6 hours. The styrene conversion rate was measured to be 89.50%. The emulsion was demulsified by ethanol and the obtained precipitate was washed three times with water followed by drying to obtain polymer. The polymer was purified by dissolving in tetrahydrofuran and precipitating in ethanol and this purification process was repeated three times followed by drying. The changes in molecular weight of the polymers and its distribution were measured and analyzed using triple detection size exclusion chromatography. The results are as follows: light scattering weight-average molecular weight $M_{w,MALLS}$=789300 g/mol, molecular weight distribution of PDI=3.19, Mark-Houwink index=0.756 and branching factor g'=0.83, which confirmed that the polymer has branched structure.

Embodiment 10

Add styrene (5.0022 g, 0.0480 mol) and N,N'-dimethyl-amino ethyl methacrylate (0.7536 g, 0.0048 mol) to the reaction flask of the solution of sodium dodecyl sulfate (0.2500 g, 5 wt % styrene), sodium bicarbonate (0.1500 g, 3 wt % styrene), potassium persulfate (1.2967 g, 0.0048 mol) and water (20.0033 g, 400 wt % styrene) while stirring to homogenize. The flask was then evacuated to remove oxygen and then reacted at room temperature (~15° C.) for 4 hours. The styrene conversion rate was measured to be 89.50%. The emulsion was demulsified by ethanol and the obtained precipitate was washed three times with water followed by drying to obtain polymer. The polymer was purified by dissolving in tetrahydrofuran and precipitating in ethanol and this purification process was repeated three times followed by drying. The changes in molecular weight of the polymers and its distribution were measured and analyzed using triple detection size exclusion chromatography. The results are as follows: light scattering weight-average molecular weight $M_{w,MALLS}$=187400 g/mol, molecular weight distribution of PDI=4.79, Mark-Houwink index=0.756 and branching factor g'=0.85, which is confirmed that the polymer has branched structure.

Embodiment 11

Figure 3:
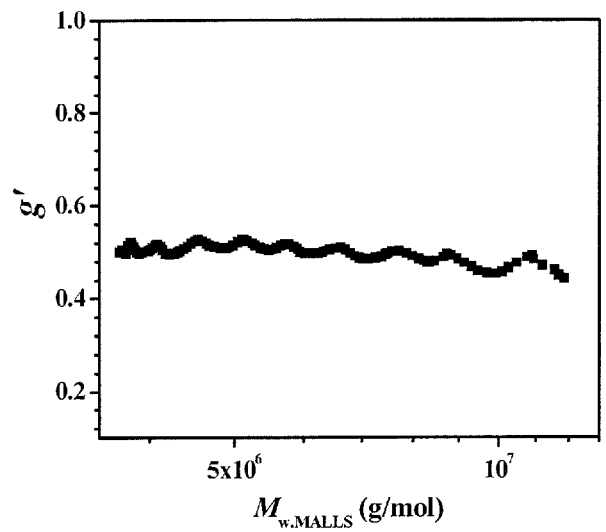
FIG. 3 shows the trend of variation of the branching factor g' of the branched polymethyl methacrylate obtained in embodiment 11 vs molecular weight.

Add methyl methacrylate (5.0000 g, 0.0499 mol) and N,N'-dimethylamino ethyl methacrylate (0.2617 g, 0.0017 mol) to the reaction flask of the solution of sodium dodecyl sulfate (0.2500 g, 5 wt % methyl methacrylate), sodium bicarbonate (0.1500 g, 3 wt % methyl methacrylate), potassium persulfate (0.4500 g, 0.0017 mol) and water (20.0000 g, 400 wt % methyl methacrylate) while stirring to homogenize. The flask was then evacuated to remove oxygen and then reacted at room temperature (~35° C.) for 25 mins. The methyl methacrylate conversion rate was measured to be 94.72%. The emulsion was demulsified by ethanol and the obtained precipitate was washed three times with water followed by drying to obtain polymer. The polymer was purified by dissolving in tetrahydrofuran and precipitating in ethanol and this purification process was repeated three times followed by drying. The changes in molecular weight of the polymers and its distribution were measured and analyzed using triple detection size exclusion chromatography. The results are as follows: light scattering weight-average molecular weight $M_{w,MALLS}$=5343000 g/mol, molecular weight distribution of PDI=3.65, Mark-Houwink index=0.601 and branching factor g'=0.50, which confirmed that the polymer has branched structure. FIG. 3 shows the trend of variation of the branching factor g' of the branched polymethyl methacrylate obtained in embodiment 11 vs molecular weight.

Embodiment 12

Figure 4:
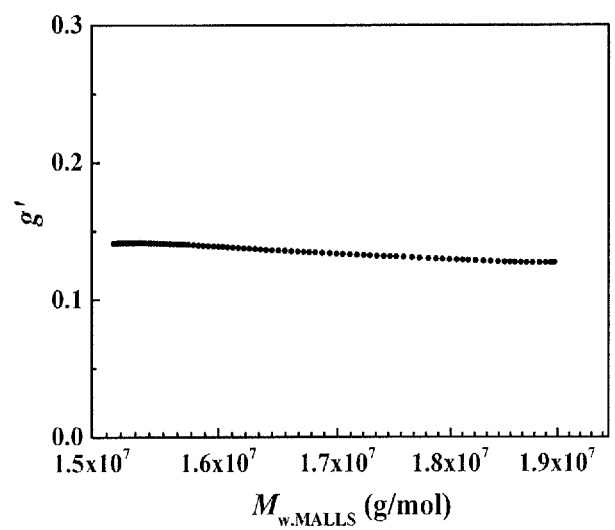
FIG. 4 shows the trend of variation of the branching factor g' of the branched polymethyl methacrylate obtained in embodiment 12 vs molecular weight.

Add methyl methacrylate (5.0000 g, 0.0499 mol) and N,N'-dimethylamino ethyl methacrylate (0.3142 g, 0.0020 mol) to the reaction flask of the solution of sodium dodecyl sulfate (0.2500 g, 5 wt % methyl methacrylate), sodium bicarbonate (0.1500 g, 3 wt % methyl methacrylate), potassium persulfate (0.5402 g, 0.0020 mol) and water (20.0000 g, 400 wt % methyl methacrylate) while stirring to homogenize. The flask was then evacuated to remove oxygen and then reacted at room temperature (~35° C.) for 12 mins. The methyl methacrylate conversion rate was measured to be 87.06%. The emulsion was demulsified by ethanol and the obtained precipitate was washed three times with water followed by drying to obtain polymer. The polymer was purified by dissolving in tetrahydrofuran and precipitating in ethanol and this purification process was repeated three times followed by drying. The changes in molecular weight of the polymers and its distribution were measured and analyzed using triple detection size exclusion chromatography. The results are as follows: light scattering weight-average molecular weight $M_{w,MALLS}$=16460000 g/mol, molecular weight distribution of PDI=2.25 and branching factor g'=0.14, which confirmed that the polymer has branched structure. FIG. 4 shows the trend of variation of the branching factor g' of the branched polymethyl methacrylate obtained in embodiment 12 vs molecular weight.

Embodiment 13

Add methyl methacrylate (5.0000 g, 0.0499 mol) and N,N'-dimethylamino ethyl methacrylate (0.1884 g, 0.0012 mol) to the reaction flask of the solution of sodium dodecyl sulfate (0.2500 g, 5 wt % methyl methacrylate), sodium bicarbonate (0.1500 g, 3 wt % methyl methacrylate), potassium persulfate (0.3241 g, 0.0012 mol) and water (20.0000 g, 400 wt % methyl methacrylate) while stirring to homogenize. The flask was then evacuated to remove oxygen and then reacted at room temperature (~35° C.) for 30 mins. The methyl methacrylate conversion rate was measured to be 93.52%. The emulsion was demulsified by ethanol and the obtained precipitate was washed three times with water followed by drying to obtain polymer. The polymer was purified by dissolving in tetrahydrofuran and precipitating in ethanol and this purification process was repeated three times followed by drying. The changes in molecular weight of the polymers and its distribution were measured and analyzed using triple detection size exclusion chromatography. The results are as follows: light scattering weight-average molecular weight $M_{w,MALLS}$=1094000 g/mol, molecular weight distribution of PDI=2.39 and branching factor g'=0.84, which confirmed that the polymer has branched structure.

Embodiment 14

Add methyl methacrylate (5.0000 g, 0.0499 mol) and N,N'-dimethylamino ethyl methacrylate (0.1572 g, 0.0010 mol) to the reaction flask of the solution of sodium dodecyl sulfate (0.2500 g, 5 wt % methyl methacrylate), sodium bicarbonate (0.1500 g, 3 wt % methyl methacrylate), ammonium persulfate (0.4564 g, 0.0020 mol) and water (20.0000 g, 400 wt % methyl methacrylate) while stirring to homogenize. The flask was then evacuated to remove oxygen and then reacted at room temperature (~35° C.) for 45 mins. The methyl methacrylate conversion rate was measured to be 97.28%. The emulsion was demulsified by ethanol and the obtained precipitate was washed three times with water followed by drying to obtain polymer. The polymer was purified by dissolving in tetrahydrofuran and precipitating in ethanol and this purification process was repeated three times followed by drying. The changes of molecular weight and its distribution of the polymers were measured and analyzed using triple detection size exclusion chromatography. The results are as follows: light scattering weight-average molecular weight $M_{w,MALLS}$=1902000 g/mol, molecular weight distribution of PDI=2.25 and branching factor g'=0.86, which confirmed that the polymer has branched structure.

Embodiment 15

Add methyl methacrylate (5.0000 g, 0.0499 mol) and N,N'-dimethylamino ethyl methacrylate (0.7851 g, 0.0050 mol) to the reaction flask of the solution of sodium dodecyl sulfate (0.2500 g, 5 wt % methyl methacrylate), sodium bicarbonate (0.1500 g, 3 wt % methyl methacrylate), potassium persulfate (0.6750 g, 0.0020 mol) and water (30.0000 g, 600 wt % methyl methacrylate) while stirring to homogenize. The flask was then evacuated to remove oxygen and then reacted at room temperature (~25° C.) for 10 mins. The methyl methacrylate conversion rate was measured to be 91.53%. The emulsion was demulsified by ethanol and the obtained precipitate was washed three times with water followed by drying to obtain polymer. The polymer was purified by dissolving in tetrahydrofuran and precipitating in ethanol and this purification process was repeated three times followed by drying. The changes in molecular weight of the polymers and its distribution were measured and analyzed using triple detection size exclusion chromatography. The results are as follows: light scattering weight-average molecular weight $M_{w,MALLS}$=860500 g/mol, molecular weight distribution of PDI=3.43 and branching factor g'=0.42, which confirmed that the polymer has branched structure.

Embodiment 16

Figure 5:
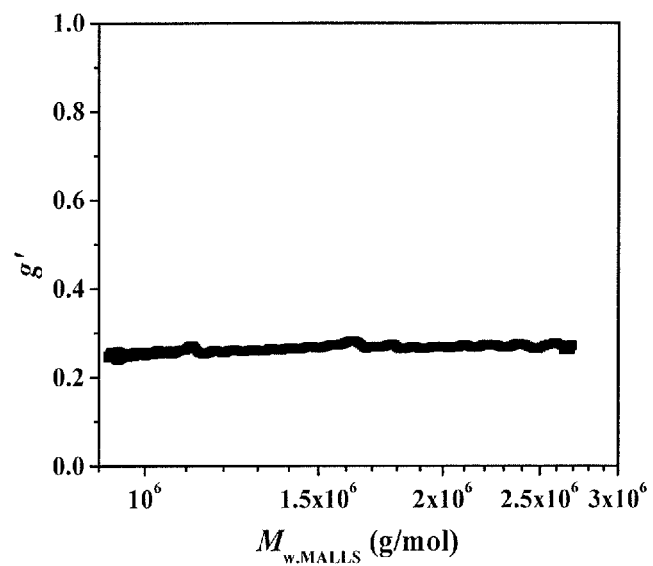
FIG. 5 shows the trend of variation of the branching factor g' of the branched polyn-butyl methacrylate obtained in embodiment 16 vs molecular weight.

Add n-butyl methacrylate (5.0000 g, 0.0352 mol) and N,N'-dimethylamino ethyl methacrylate (0.2617 g, 0.0017 mol) to the reaction flask of the solution of sodium dodecyl sulfate (0.2500 g, 5 wt % n-butyl methacrylate), sodium bicarbonate (0.1500 g, 3 wt % n-butyl methacrylate), potassium persulfate (0.3169 g, 0.0012 mol) and water (30.0000 g, 600 wt % n-butyl methacrylate) while stirring to homogenize. The flask was then evacuated to remove oxygen and then reacted at room temperature (~25° C.) for 2 hours. The n-butyl methacrylate conversion rate was measured to be 99.09%. The emulsion was demulsified by ethanol and the obtained precipitate was washed three times with water followed by drying to obtain polymer. The polymer was purified by dissolving in tetrahydrofuran and precipitating in ethanol and this purification process was repeated three times followed by drying. The changes in molecular weight of the polymers and its distribution were measured and analyzed using triple detection size exclusion chromatography. The results are as follows: light scattering weight-average molecular weight $M_{w,MALLS}$=1343000 g/mol, molecular weight distribution of PDI=7.77 and branching factor g'=0.30, which confirmed that the polymer has branched structure. FIG. 5 shows the trend of variation of the branching factor g' of the branched polyn-butyl methacrylate obtained in embodiments 16 vs molecular weight.

Embodiment 17

Add tert-butyl methacrylate (5.0000 g, 0.0352 mol) and N,N'-dimethylamino ethyl methacrylate (0.2617 g, 0.0017 mol) to the reaction flask of the solution of sodium dodecyl benzene sulfonate (0.2500 g, 5 wt % tert-butyl methacrylate), sodium bicarbonate (0.1500 g, 3 wt % tert-butyl methacrylate), potassium persulfate (0.3170 g, 0.0012 mol) and water (15.0000 g, 300 wt % tert-butyl methacrylate) while stirring to homogenize. The flask was then evacuated to remove oxygen and then reacted at room temperature (~25° C.) for 1 hours. The tert-butyl methacrylate conversion rate was measured to be 90.09%. The emulsion was demulsified by ethanol and the obtained precipitate was washed three times with water followed by drying to obtain polymer. The polymer was purified by dissolving in tetrahydrofuran and precipitating in ethanol and this purification process was repeated three times followed by drying. The changes in molecular weight of the polymers and its distribution were measured and analyzed using triple detection size exclusion chromatography. The results are as follows: light scattering weight-average molecular weight $M_{w.MALLS}$=1262000 g/mol, molecular weight distribution of PDI=3.65 and branching factor g'=0.63, which confirmed that the polymer has branched structure.

Embodiment 18

Figure 6:
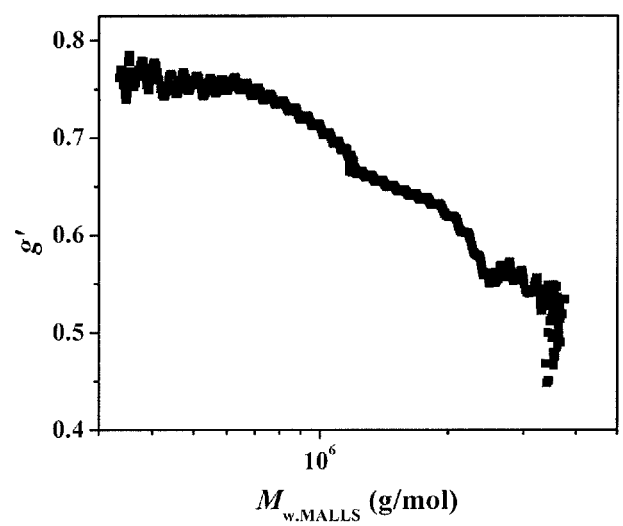
FIG. 6 shows the trend of variation of the branching factor g' of the branched polyvinyl acetate obtained in embodiment 18 vs molecular weight.

Add vinyl acetate (5.0001 g, 0.0580 mol) and N,N'-dimethylamino ethyl methacrylate (0.3652 g, 0.0023 mol) to the reaction flask of the solution of sodium dodecyl sulfate (0.2500 g, 5 wt % vinyl acetate), sodium bicarbonate (0.1500 g, 3 wt % vinyl acetate), potassium persulfate (0.6280 g, 0.0023 mol) and water (20.0000 g, 400 wt % vinyl acetate) while stirring to homogenize. The flask was then evacuated to remove oxygen and then reacted at room temperature (~25° C.) for 6 hours. The vinyl acetate conversion rate was measured to be 90.04%. The emulsion was demulsified by ethanol and the obtained precipitate was washed three times with water followed by drying to obtain polymer. The polymer was purified by dissolving in tetrahydrofuran and precipitating in ethanol and this purification process was repeated three times followed by drying. The changes in molecular weight of the polymers and its distribution were measured and analyzed using triple detection size exclusion chromatography. The results are as follows: light scattering weight-average molecular weight $M_{w.MALLS}$=1225000 g/mol, molecular weight distribution of PDI=8.81, Mark-Houwink index=0.571 and branching factor g'=0.84, which confirmed that the polymer has branched structure. FIG. 6 shows the trend of variation of the branching factor g' of the branched polyvinyl acetate obtained in embodiment 18 vs molecular weight.

Embodiment 19

Add vinyl acetate (5.0006 g, 0.0580 mol) and N,N'-dimethylamino ethyl methacrylate (0.9118 g, 0.0058 mol) to the reaction flask of the solution of sodium dodecyl sulfate (0.2500 g, 5 wt % vinyl acetate), sodium bicarbonate (0.1500 g, 3 wt % vinyl acetate), potassium persulfate (1.5661 g, 0.0058 mol) and water (20.0000 g, 400 wt % vinyl acetate) while stirring to homogenize. The flask was then evacuated to remove oxygen and then reacted at room temperature (~35° C.) for 6 hours. The vinyl acetate conversion rate was measured to be 90.79%. The emulsion was demulsified by ethanol and the obtained precipitate was washed three times with water followed by drying to obtain polymer. The polymer was purified by dissolving in tetrahydrofuran and precipitating in ethanol and this purification process was repeated three times followed by drying. The changes in molecular weight of the polymers and its distribution were measured and analyzed using triple detection size exclusion chromatography. The results are as follows: light scattering weight-average molecular weight $M_{w.MALLS}$=758000 g/mol, molecular weight distribution of PDI=2.77, Mark-Houwink index=0.796 and branching factor e=0.76, which confirmed that the polymer has branched structure.

Embodiment 20

Add vinyl acetate (5.0005 g, 0.0580 mol) and N,N'-dimethylamino ethyl methacrylate (0.3034 g, 0.0019 mol) to the reaction flask of the solution of sodium dodecyl sulfate (0.2500 g, 5 wt % vinyl acetate), sodium bicarbonate (0.1500 g, 3 wt % vinyl acetate), potassium persulfate (0.5137 g, 0.0019 mol) and water (20.0018 g, 400 wt % vinyl acetate) while stirring to homogenize. The flask was then evacuated to remove oxygen and then reacted at room temperature (~35° C.) for 6 hours. The vinyl acetate conversion rate was measured to be 94.61%. The emulsion was demulsified by ethanol and the obtained precipitate was washed three times with water followed by drying to obtain polymer. The polymer was purified by dissolving in tetrahydrofuran and precipitating in ethanol and this purification process was repeated three times followed by drying. The changes in molecular weight of the polymers and its distribution were measured and analyzed using triple detection size exclusion chromatography. The results are as follows: light scattering weight-average molecular weight $M_{w.MALLS}$=297500 g/mol, molecular weight distribution of PDI=3.98, Mark-Houwink index=0.655 and branching factor g'=0.82, which confirmed that the polymer has branched structure.

Embodiment 21

Figure 7:
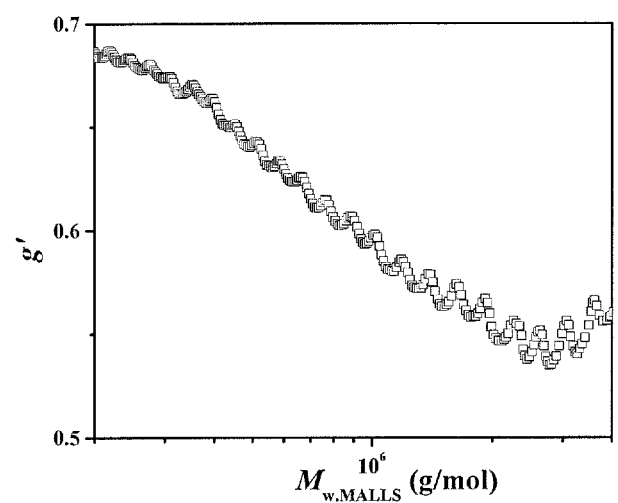
FIG. 7 shows the trend of variation of the branching factor g' of the branched polyvinyl acetate obtained in embodiment 21 vs molecular weight.

Add vinyl acetate (5.0001 g, 0.0580 mol) and N,N'-dimethylamino ethyl methacrylate (0.2355 g, 0.0015 mol) to the reaction flask of the solution of sodium dodecyl sulfate (0.2500 g, 5 wt % vinyl acetate), sodium bicarbonate (0.1500 g, 3 wt % vinyl acetate), potassium persulfate (0.4053 g, 0.0015 mol) and water (20.0031 g, 400 wt % vinyl acetate) while stirring to homogenize. The flask was then evacuated to remove oxygen and then reacted at room temperature (~35° C.) for 6 hours. The vinyl acetate conversion rate was measured to be 98.93%. The emulsion was demulsified by ethanol and the obtained precipitate was washed three times with water followed by drying to obtain polymer. The polymer was purified by dissolving in tetrahydrofuran and precipitating in ethanol and this purification process was repeated three times followed by drying. The changes in molecular weight of the polymers and its distribution were measured and analyzed using triple detection size exclusion chromatography. The results are as follows: light scattering weight-average molecular weight $M_{w.MALLS}$=184400 g/mol, molecular weight distribution of PDI=4.57, Mark-Houwink index=0.671 and branching factor g'=0.60, which confirmed that the polymer has branched structure. FIG. 7 shows the trend of variation of the branching factor g' of the branched polyvinyl acetate obtained in embodiment 21 vs molecular weight.

Embodiment 22

Add vinyl acetate (5.0002 g, 0.0580 mol) and N,N'-dimethylamino ethyl methacrylate (0.1884 g, 0.0012 mol) to the reaction flask of the solution of sodium dodecyl sulfate (0.2500 g, 5 wt % vinyl acetate), sodium bicarbonate (0.1500 g, 3 wt % vinyl acetate), potassium persulfate (0.3243 g, 0.0012 mol) and water (20.0005 g, 400 wt % vinyl acetate) while stirring to homogenize. The flask was then evacuated to remove oxygen and then reacted at room temperature (~35° C.) for 6 hours. The vinyl acetate conversion rate was measured to be 90.45%. The emulsion was demulsified by ethanol and the obtained precipitate was washed three times with water followed by drying to obtain polymer. The polymer was purified by dissolving in tetrahydrofuran and precipitating in ethanol and this purification process was repeated three times followed by drying. The changes in molecular weight of the polymers and its distribution were measured and analyzed using triple detection size exclusion chromatography. The results are as follows: light scattering weight-average molecular weight $M_{w,MALLS}$=145000 g/mol, molecular weight distribution of PDI=3.14, Mark-Houwink index=0.502 and branching factor g'=0.37, which confirmed that the polymer has branched structure.

Embodiment 23

Add vinyl acetate (5.0003 g, 0.0580 mol) and N,N'-dimethylamino ethyl methacrylate (0.4553 g, 0.0029 mol) to the reaction flask of the solution of sodium dodecyl sulfate (0.2500 g, 5 wt % vinyl acetate), sodium bicarbonate (0.1500 g, 3 wt % vinyl acetate), potassium persulfate (0.7831 g, 0.0029 mol) and water (20.0054 g, 400 wt % vinyl acetate) while stirring to homogenize. The flask was then evacuated to remove oxygen and then reacted at room temperature (~35° C.) for 6 hours. The vinyl acetate conversion rate was measured to be 91.25%. The emulsion was demulsified by ethanol and the obtained precipitate was washed three times with water followed by drying to obtain polymer. The polymer was purified by dissolving in tetrahydrofuran and precipitating in ethanol and this purification process was repeated three times followed by drying. The changes in molecular weight of the polymers and its distribution were measured and analyzed using triple detection size exclusion chromatography. The results are as follows: light scattering weight-average molecular weight $M_{w,MALLS}$=466400 g/mol, molecular weight distribution of PDI=8.72, Mark-Houwink index=0.762 and branching factor g'=0.88, which confirmed that the polymer has branched structure.

Embodiment 24

Add vinyl acetate (5.0005 g, 0.0580 mol) and N,N'-dimethylamino ethyl methacrylate (0.3019 g, 0.0019 mol) to the reaction flask of the solution of sodium dodecyl benzene sulfonate (0.2500 g, 5 wt % vinyl acetate), sodium bicarbonate (0.1500 g, 3 wt % vinyl acetate), ammonium persulfate (0.8235 g. 0.0038 mol) and water (25.0061 g, 500 wt % vinyl acetate) while stirring to homogenize. The flask was then evacuated to remove oxygen and then reacted at room temperature (~25° C.) for 10 hours. The vinyl acetate conversion rate was measured to be 97.30%. The emulsion was demulsified by ethanol and the obtained precipitate was washed three times with water followed by drying to obtain polymer. The polymer was purified by dissolving in tetrahydrofuran and precipitating in ethanol and this purification process was repeated three times followed by drying. The changes in molecular weight of the polymers and its distribution were measured and analyzed using triple detection size exclusion chromatography. The results are as follows: light scattering weight-average molecular weight $M_{w,MALLS}$=346500 g/mol, molecular weight distribution of PDI=7.88, Mark-Houwink index=0.685 and branching factor g'=0.76, which confirmed that the polymer has branched structure.

Embodiment 25

Add vinyl acetate (5.0003 g, 0.0580 mol) and N,N'-dimethylamino ethyl methacrylate (0.3019 g, 0.0019 mol) to the reaction flask of the solution of sodium dodecyl benzene sulfonate (0.2500 g, 5 wt % vinyl acetate), sodium bicarbonate (0.1500 g, 3 wt % vinyl acetate), potassium persulfate (0.5188 g, 0.0019 mol) and water (10.0012 g, 200 wt % vinyl acetate) while stirring to homogenize. The flask was then evacuated to remove oxygen and then reacted at room temperature (~25° C.) for 0.5 hours. The vinyl acetate conversion rate was measured to be 90.45%. The emulsion was demulsified by ethanol and the obtained precipitate was washed three times with water followed by drying to obtain polymer. The polymer was purified by dissolving in tetrahydrofuran and precipitating in ethanol and this purification process was repeated three times followed by drying. The changes in molecular weight of the polymers and its distribution were measured and analyzed using triple detection size exclusion chromatography. The results are as follows: light scattering weight-average molecular weight $M_{w,MALLS}$=357000 g/mol, molecular weight distribution of PDI=6.18, Mark-Houwink index=0.696 and branching factor g'=0.81, which confirmed that the polymer has branched structure.

The invention claimed is:

1. A process for preparing branched polymers by an in situ reaction via free radical emulsion polymerization at room temperature, comprising combining a polymerizable reductant monomer containing both a polymerizable double bond and a reducing group with an oxidant to be used as an initiator, water as a medium, an anionic surfactant as an emulsifier, sodium bicarbonate as a pH regulator, and a vinyl monomer as a monomer, wherein the polymerizable reductant monomer is a tertiary amine containing polymerizable double bonds.

2. The process of claim 1, wherein the vinyl monomer is styrene, vinyl acetate or (meth) acrylate.

3. The process of claim 1, wherein the molar ratio of polymerizable reductant monomer to oxidant is 0.5~2:1.

4. The process of claim 1, wherein the molar ratio of polymerizable reductant monomer to monomer is 1~5:50.

5. The process of claim 1, wherein the mass ratio of water to monomer is 2~6:1.

6. The process of claim 1, wherein the polymerization is carried out at room temperature and the polymerization reaction time is controlled in a range of 10 mins~10 hours.

7. The process of claim 1, wherein the anionic surfactant is sodium dodecyl benzene sulfonate or sodium dodecyl sulfate.

8. The process of claim 1, wherein the oxidant is peroxide.

* * * * *